US012770793B2

(12) United States Patent
Park

(10) Patent No.: US 12,770,793 B2
(45) Date of Patent: Oct. 20, 2026

(54) MULTILAYER ELECTRONIC COMPONENT AND MANUFACTURING METHOD THEREOF

(71) Applicant: SAMSUNG ELECTRO-MECHANICS CO., LTD., Suwon-si (KR)

(72) Inventor: Yang-Seok Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 163 days.

(21) Appl. No.: 18/541,776

(22) Filed: Dec. 15, 2023

(65) Prior Publication Data

US 2024/0249887 A1 Jul. 25, 2024

(30) Foreign Application Priority Data

Jan. 19, 2023 (KR) ........................ 10-2023-0008270
Apr. 13, 2023 (KR) ........................ 10-2023-0048835

(51) Int. Cl.

| | |
|---|---|
| ***H01G 4/30*** | (2006.01) |
| ***C04B 35/645*** | (2006.01) |
| ***H01G 2/12*** | (2006.01) |
| ***H01G 4/012*** | (2006.01) |
| ***H01G 4/12*** | (2006.01) |
| ***H01G 4/224*** | (2006.01) |

(52) U.S. Cl.

CPC ............ *H01G 4/30* (2013.01); *C04B 35/645* (2013.01); *H01G 2/12* (2013.01); *H01G 4/012* (2013.01); *H01G 4/12* (2013.01); *H01G 4/224* (2013.01)

(58) Field of Classification Search

None

See application file for complete search history.

(56) References Cited

U.S. PATENT DOCUMENTS

| | | | | |
|---|---|---|---|---|
| 7,864,505 | B1 * | 1/2011 | O'Brien | H01G 4/203 361/311 |
| 10,395,839 | B1 * | 8/2019 | Park | H01G 4/232 |
| 2006/0180899 | A1 * | 8/2006 | Ko | H01G 4/232 257/E23.118 |
| 2018/0286591 | A1 * | 10/2018 | Kim | H01G 4/12 |
| 2020/0043667 | A1 | 2/2020 | Park et al. | |

(Continued)

FOREIGN PATENT DOCUMENTS

| | | | |
|---|---|---|---|
| JP | S59-16216 | B2 | 5/2016 |
| KR | 10-2014-0088263 | A | 7/2014 |

(Continued)

*Primary Examiner* — Timothy J. Dole
*Assistant Examiner* — Esther N Lian
(74) *Attorney, Agent, or Firm* — Morgan, Lewis & Bockius LLP

(57) ABSTRACT

In a multilayer electronic component according to an aspect or another aspect of the present disclosure, a protective layer including a plurality of oxides having a wired form is disposed on at least a portion of an external surface of a body. Alternatively or optionally, the protective layer including an oxide having a wired form is disposed on at least a portion of a space between the body and a side margin portion. A surface of the multilayer electronic component has superhydrophobicity, thereby improving moisture resistance reliability of the multilayer electronic component.

31 Claims, 17 Drawing Sheets

I - I'

(56) References Cited

U.S. PATENT DOCUMENTS

| | | | | |
|---|---|---|---|---|
| 2020/0066444 | A1* | 2/2020 | Yang | H01G 4/232 |
| 2020/0090871 | A1* | 3/2020 | Ahn | H01G 4/30 |
| 2021/0272753 | A1* | 9/2021 | Chikuma | H01G 4/224 |
| 2021/0272756 | A1* | 9/2021 | Chikuma | H01G 4/1209 |
| 2022/0199328 | A1* | 6/2022 | Choi | H01G 4/012 |
| 2022/0208465 | A1* | 6/2022 | Lee | H01G 4/012 |
| 2022/0208468 | A1* | 6/2022 | Jeong | H01G 4/012 |

FOREIGN PATENT DOCUMENTS

| | | | | | |
|---|---|---|---|---|---|
| KR | 20180045803 | A | * | 5/2018 | H01G 4/232 |
| KR | 10-2019-0121135 | A | | 10/2019 | |

* cited by examiner

MULTILAYER ELECTRONIC COMPONENT AND MANUFACTURING METHOD THEREOF

CROSS-REFERENCE TO RELATED APPLICATION (S)

This application claims benefit of priority to Korean Patent Application Nos. 10-2023-0008270 filed on Jan. 19, 2023 and 10-2023-0048835 filed on Apr. 13, 2023 in the Korean Intellectual Property Office, the disclosures of which are incorporated herein by reference in their entirety.

TECHNICAL FIELD

The present disclosure relates to a multilayer electronic component and a manufacturing method thereof.

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

As various electronic devices have a reduced size and higher output, it is necessary to achieve miniaturization and high capacitance of multilayer ceramic capacitors. Recently, in multilayer ceramic capacitors, attempts have been made to reduce the thickness of a cover portion and a margin portion to improve a proportion occupied by a capacitance formation portion.

However, when the cover portion and the margin portion have an excessively reduced thickness, the possibility of exposure of the capacitance formation portion may increase. In particular, a multilayer ceramic capacitor having a structure in which a side margin is additionally attached, moisture may permeate through minute gaps, resulting in issues such as a decrease in insulation resistance, insulation breakdown, and a decrease in moisture resistance reliability of the multilayer ceramic capacitor.

Accordingly, there is a need for a structural design capable of easily achieving miniaturization and implementation of high capacitance of multilayer electronic components while preventing a decrease in moisture resistance reliability.

SUMMARY

An aspect of the present disclosure is to resolve an issue such as a decrease in moisture resistance reliability when a cover portion and a margin portion have a reduced thickness.

Another aspect of the present disclosure is to resolve an issue such as a decrease in moisture resistance reliability of a multilayer electronic component, having a structure in which a side margin portion is additionally attached, due to moisture permeating through a gap that may occur between the side margin portion and a body.

However, the aspects of the present disclosure are not limited to those set forth herein, and will be more easily understood in the course of describing specific example embodiments of the present disclosure.

According to an aspect of the present disclosure, there is provided a multilayer electronic component including a body including a dielectric layer and an internal electrode disposed alternately with the dielectric layer in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction, and an external electrode disposed on one of the third and fourth surfaces. A protective layer including a plurality of oxides having a wired form may be disposed on at least a portion of an external surface of the body.

According to another aspect of the present disclosure, there is provided a multilayer electronic component including a laminate including a dielectric layer and an internal electrode disposed alternately with the dielectric layer in a first direction, the laminate having first and second surfaces opposing each other in the first direction, third and fourth surfaces connected to the first and second surfaces and opposing each other in a second direction, and fifth and sixth surfaces connected to the first to fourth surfaces and opposing each other in a third direction, a side margin portion disposed on one of the fifth and sixth surfaces, and an external electrode disposed on one of the third and fourth surfaces. A protective layer including a plurality of oxides having a wired form may be disposed on at least a portion of a space between the laminate and the side margin portion.

According to another aspect of the present disclosure, there is provided a multilayer electronic component including a laminate including a dielectric layer and an internal electrode disposed alternately with the dielectric layer in a first direction, the laminate having first and second surfaces opposing each other in the first direction, third and fourth surfaces connected to the first and second surfaces and opposing each other in a second direction, and fifth and sixth surfaces connected to the first to fourth surfaces and opposing each other in a third direction; an external electrode disposed on one of the third and fourth surfaces; and a plurality of oxide wires extending away from at least a portion of an exterior surface among the first, second, fifth, and sixth surfaces of the laminate.

According to another aspect of the present disclosure, there is provided a method of manufacturing a multilayer electronic component. The method includes forming a conductive paste layer on a surface of a ceramic green sheet; stacking the ceramic green sheet with the conductive paste layer and sintering to form a body; forming an external electrode on the body; and forming a plurality of oxide wires on an external surface of the body.

According to example embodiments of the present disclosure, a multilayer electronic component may have improved moisture resistance reliability by disposing a protective layer including a plurality of wire-type oxides on at least a portion of an external surface of a body.

According to example embodiments of the present disclosure, a multilayer electronic component may have improved moisture resistance reliability by disposing a protective layer including a plurality of oxides having a wired form on at least a portion of a space between a body and a side margin portion.

The various and beneficial advantages and effects of the present disclosure are not limited to those set forth herein, and will be more easily understood in the course of describing specific example embodiments.

BRIEF DESCRIPTION OF DRAWINGS

The above and other aspects, features, and advantages of the present disclosure will be more clearly understood from the following taken in detailed description, conjunction with the accompanying drawings, in which.

DETAILED DESCRIPTION

Figure 1:
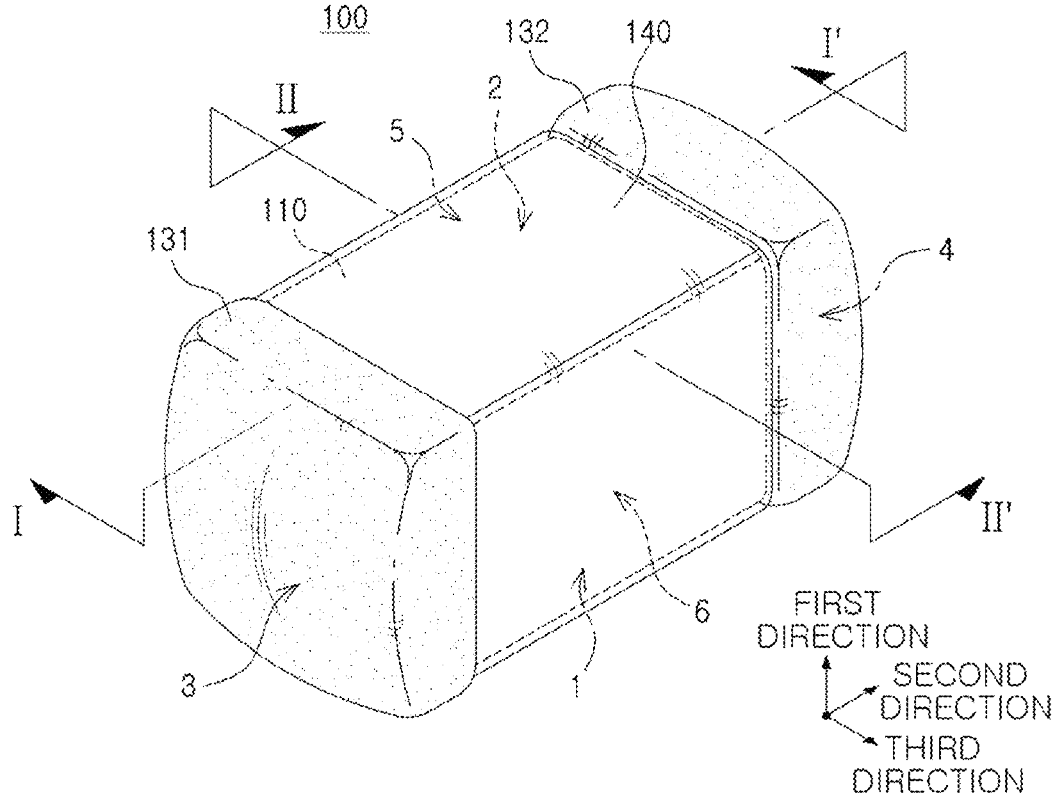
FIG. 1 is a perspective view of a multilayer electronic component according to an aspect of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as “comprising” or “including,” it means that it may include other elements as well, rather than excluding other elements, unless specifically stated otherwise.

In the drawings, a first direction may be defined as a direction in which first and second internal electrodes are alternately disposed with a dielectric layer interposed therebetween or a thickness (T) direction, the second direction, among the second and third directions perpendicular to the first direction, may be defined as a length (L) direction, and the third direction may be defined as a width (W) direction.

FIG. 1 is a perspective view of a multilayer electronic component according to an aspect of the present disclosure.

Figure 2:
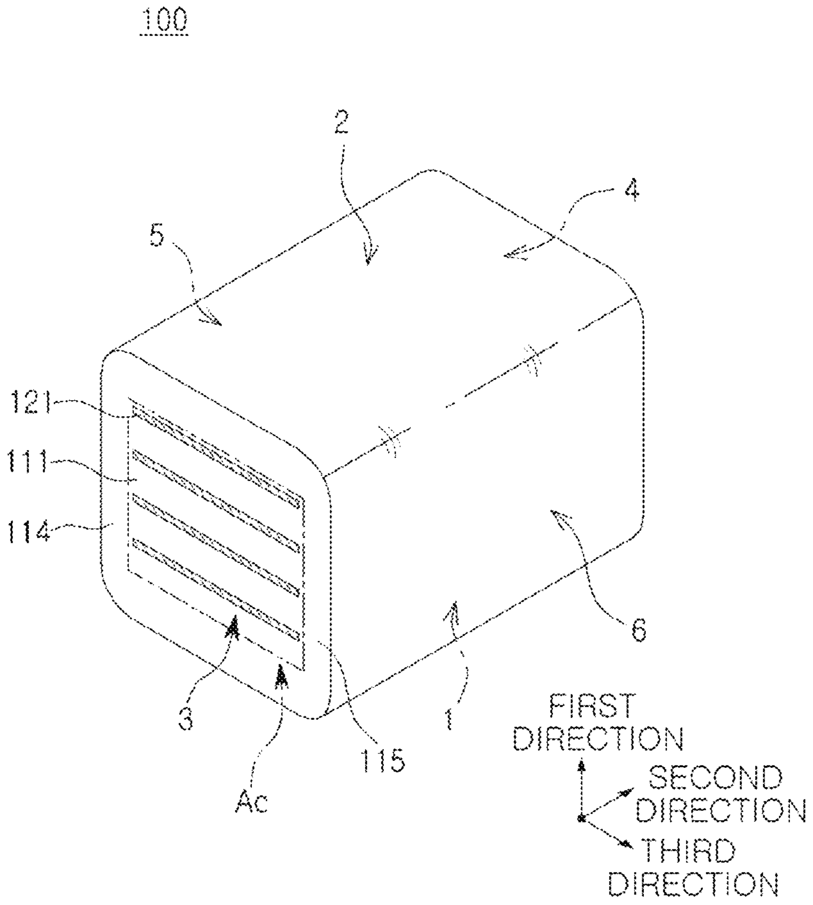
FIG. 2 is a perspective view of a body according to an aspect of the present disclosure.

FIG. 2 is a perspective view of a body according to an example embodiment of the present disclosure.

Figure 3:
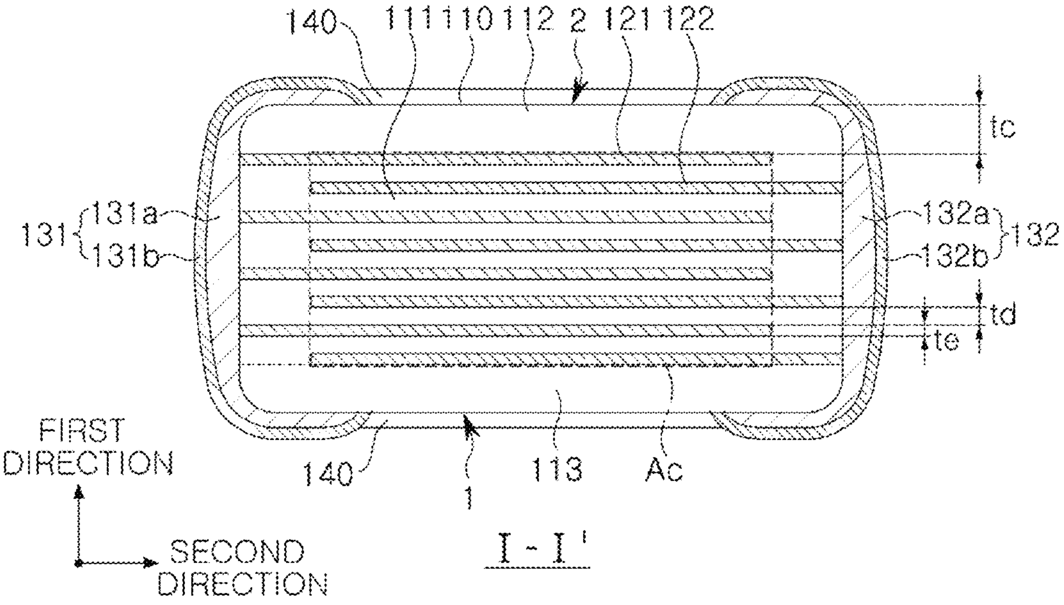
FIG. 3 is a cross-sectional view taken along line I-I' of FIG. 1.

FIG. 3 is a cross-sectional view taken along line I-I' of FIG. 1.

Figure 4:
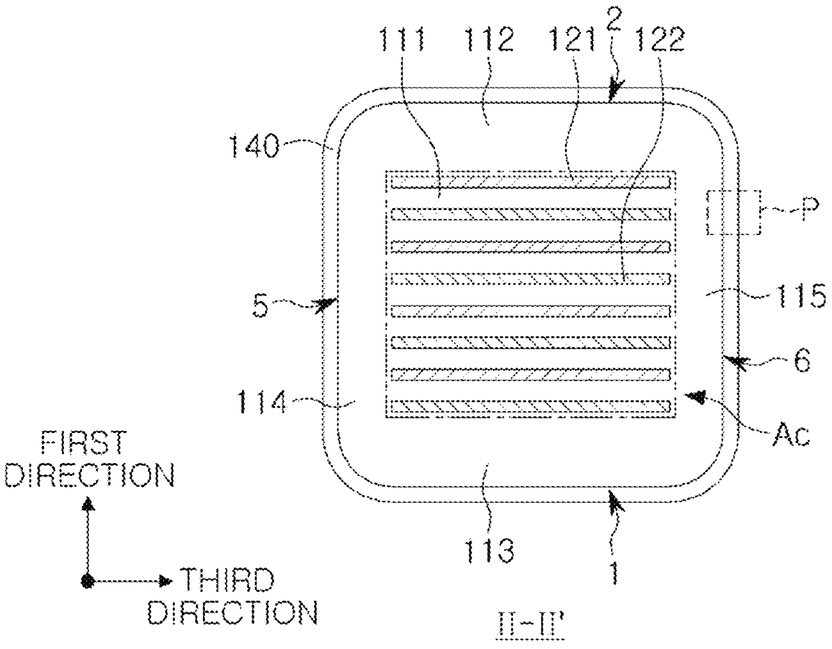
FIG. 4 is a cross section taken along line II-II of FIG. 1.

FIG. 4 is a cross section taken along line II-II of FIG. 1.

Figure 5:
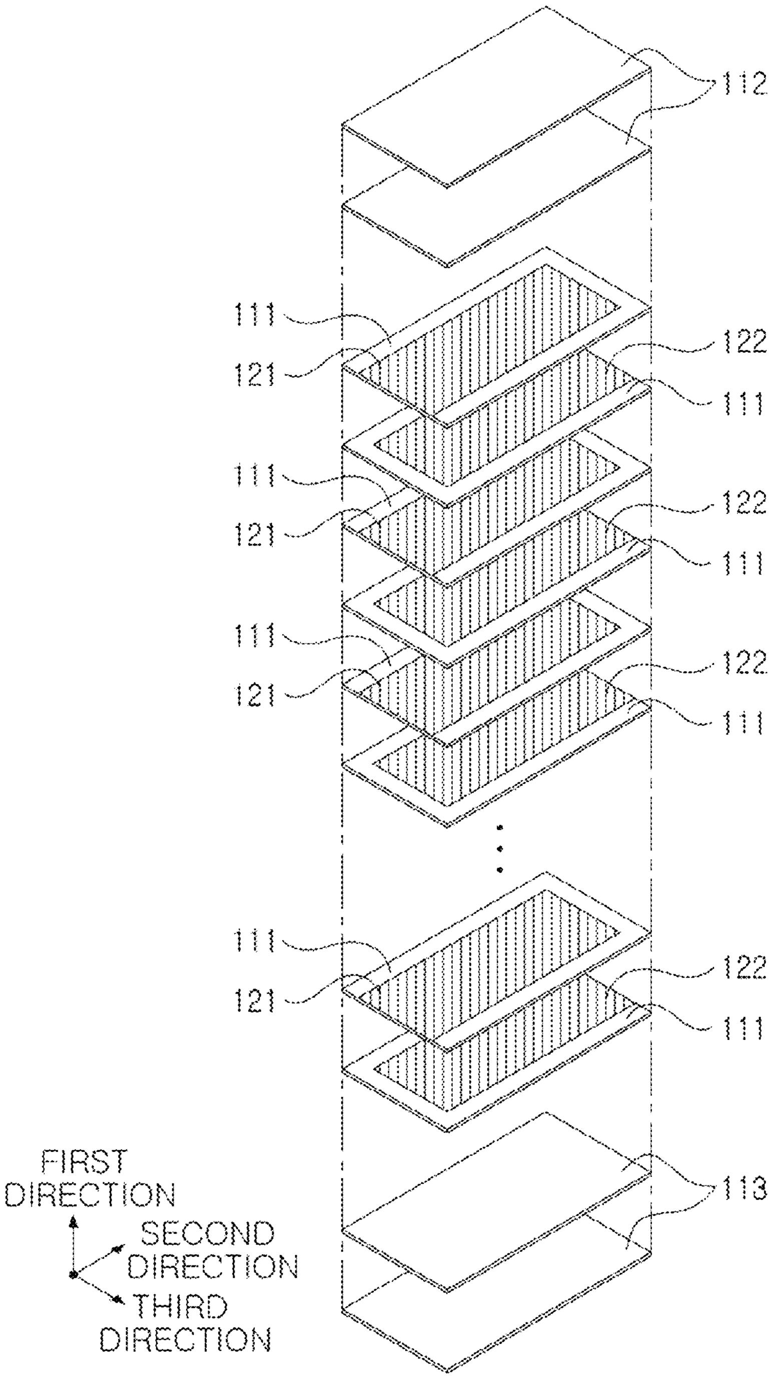
FIG. 5 is an exploded perspective view of a body according to an example embodiment.

FIG. 5 is an exploded perspective view of a body according to an example embodiment.

Figure 6:
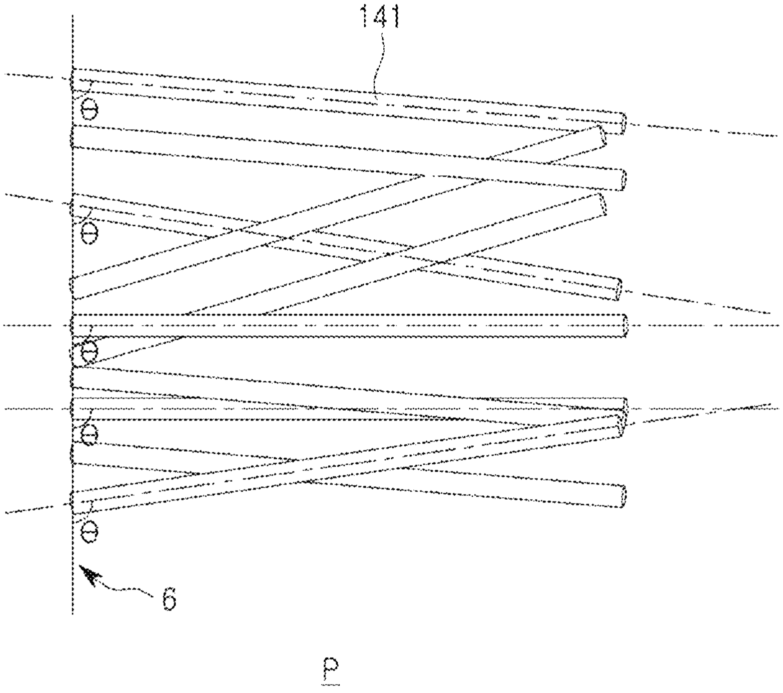
FIG. 6 is an enlarged view of region P of FIG. 4.

FIG. 6 is an enlarged view of region P of FIG. 4.

Figure 7A:
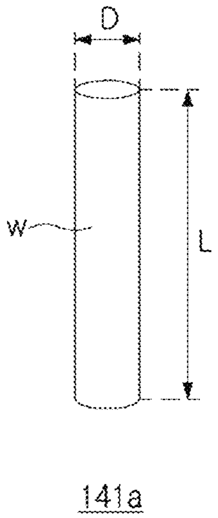
FIGS. 7A, 7B, and 7C are schematic diagrams illustrating various wired forms according to an example embodiment.
Figure 7B:
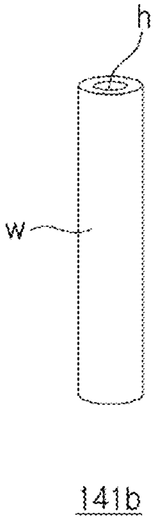
Figure 7C:
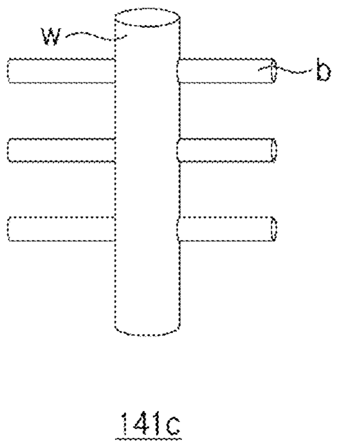

FIGS. 7A, 7B, and 7C are schematic diagrams illustrating various wired forms according to an example embodiment.

Hereinafter, a multilayer electronic component 100 according to an aspect of the present disclosure will be described in detail with reference to FIGS. 1 to 7.

The multilayer electronic component 100 according to an aspect of the present disclosure may include a body 110 including a dielectric layer 111 and internal electrodes 121 and 122 disposed alternately with the dielectric layer 111 in a first direction, the body having first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, and external electrodes 131 and 132 disposed on the third and fourth surfaces 3 and 4. A protective layer 140 including a plurality of oxides 141 having a wired form may be disposed on at least a portion of an external surface of the body 110.

The body 110 may include the dielectric layer 111 and the internal electrodes 121 and 122 disposed alternately with the dielectric layer 111.

A specific shape of the body 110 is not particularly limited. However, as illustrated, the body 110 may have a hexahedral shape or a shape similar thereto. During a sintering process, ceramic powder particles included in the body 110 may shrink, such that the body 110 may not have a hexahedral shape having perfectly straight lines, but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

A plurality of dielectric layers 111, included in the body 110, may be in a sintered state, and adjacent dielectric layers 111 may be integrated with each other such that boundaries therebetween are not readily apparent without using a scanning electron microscope (SEM).

According to an aspect of the present disclosure, a raw material included in the dielectric layer 111 is not particularly limited as long as sufficient capacitance is obtainable therewith. For example, a barium titanate-based material, a lead composite perovskite-based material, or a strontium titanate-based material may be used for the raw material. The barium titanate-based material may include $BaTiO_3$-based ceramic powder particles, and examples of the ceramic powder particles may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) obtained by partially dissolving Ca or Zr in $BaTiO_3$.

In addition, the raw material included in the dielectric layer 111 may be obtained by adding various ceramic additives, organic solvents, binders, dispersants, and the like to powder particles such as barium titanate ($BaTiO_3$) depending on the purpose of the present disclosure.

An average thickness (td) of the dielectric layer 111 is not particularly limited. For example, the average thickness (td) of the dielectric layer 111 may be 0.2 μm or more and 2 μm or less. In order to more easily achieve high capacitance and miniaturization of the multilayer electronic component 100, the average thickness (td) of the dielectric layer 111 may be 0.35 μm or less.

The average thickness (td) of the dielectric layer 111 may refer to the average thickness (td) of the dielectric layer 111 disposed between the first and second internal electrodes 121 and 122.

The average thickness (td) of the dielectric layer 111 may be measured by scanning, with an SEM, a cross-section of the body 110 in length and thickness (L-T) directions at a magnification of 10,000. More specifically, thicknesses of a plurality of points of one dielectric layer 111, for example, thirty points equally spaced apart from each other in a length direction, may be measured to measure an average value thereof. The thirty equally spaced points may be designated in a capacitance formation portion Ac. In addition, when such average value measurement is performed on ten dielectric layers 111, the average thickness of the dielectric layer 111 may be further generalized.

The body 110 may include a capacitance formation portion Ac disposed within the body 110, the capacitance formation portion Ac including first and second internal electrodes 121 and 122 disposed alternately with the dielectric layer 111 interposed therebetween to form capacitance.

The capacitance formation portion Ac may be a portion contributing to forming capacitance of a capacitor, and may be formed by repeatedly laminating a plurality of first and second internal electrodes 121 and 122 with the dielectric layer 111 interposed therebetween.

The cover portions 112 and 113 may be formed by laminating a single dielectric layer or two or more dielectric layers on each of upper and lower surfaces of the capacitance formation portion Ac in a thickness direction. The cover portions 112 and 113 may basically serve to prevent damage to the internal electrodes due to physical or chemical stress.

The cover portions 112 and 113 may not include an internal electrode, and may include a material the same as that of the dielectric layer 111. That is, the cover portions 112 and 113 may include a ceramic material, for example, a barium titanate ($BaTiO_3$)-based ceramic material.

An average thickness of the cover portion 112 or 113 is not particularly limited. However, in order to more easily achieve miniaturization and high capacitance of the multilayer electronic component, an average thickness (tc) of the cover portion 112 or 113 may be 15 μm or less.

The average thickness of the cover portion 112 or 113 may refer to a size of the cover portion 112 or 113 in a first direction, and may be an average value of sizes of the cover portion 112 or 113 in a first direction, measured at five equally spaced points of an upper portion or lower portion of the capacitance formation portion Ac.

In an example embodiment, margin portions 114 and 115 may be disposed on one surface and the other surface of the capacitance formation portion Ac in a third direction.

Referring to FIG. 2, the margin portions 114 and 115 may include a margin portion 114 disposed on the fifth surface 5 of the body 110, and a margin portion 115 disposed on the sixth surface 6. That is, the margin portions 114 and 115 may be disposed on both end surfaces of the body 110 in a third direction (width direction).

The margin portions 114 and 115 may refer to a region between both ends of the first and second internal electrodes 121 and 122 and a boundary surface of the body 110, as illustrated in FIG. 2.

The margin portions 114 and 115 may basically serve to prevent damage to the internal electrodes due to physical or chemical stress.

The margin portions 114 and 115 may be formed by forming an internal electrode by coating a ceramic green sheet with a conductive paste, except for a region in which a margin portion is to be formed.

In addition, in order to suppress a step caused by the internal electrodes 121 and 122, the internal electrodes 121 and 122 may be laminated and then cut to be exposed to the fifth and sixth surfaces 5 and 6 of the body, and then a single dielectric layer or two or more dielectric layers may be laminated on both side surfaces of the capacitance formation portion Ac opposing each other in a third direction (width direction) to form the margin portions 114 and 115.

A width of the margin portion 114 or 115 is not particularly limited. However, in order to more easily achieve miniaturization and high capacitance of the multilayer electronic component, an average width of the margin portion 114 or 115 may be 15 μm or less.

The average width of the margin portion 114 or 115 may refer to an average size of the margin portion 114 or 115 in a third direction, and may be an average value of sizes of the margin portion 114 or 115 in a third direction, measured at five equally spaced points of a side surface of the capacitance formation portion Ac.

The internal electrodes 121 and 122 may be disposed alternately with the dielectric layer 111 in a first direction.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be connected to the third and fourth surfaces 3 and 4 of the body 110, respectively. Specifically, one end of the first internal electrode 121 may be connected to the third surface, and one end of the second internal electrode 122 may be connected to the fourth surface. That is, in an example embodiment, the internal electrodes 121 and 122 may be in contact with the third surface 3 or the fourth surface 4.

As illustrated in FIGS. 2 and 3, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 130 may be disposed on the third surface 3 of the body 110 to be connected to the first internal electrode 121, and a second external electrode 140 may be disposed on the fourth surface 4 of the body 110 to be connected to the second internal electrode 122.

That is, the first internal electrode 121 may be connected to the first external electrode 131 without being connected to the second external electrode 132, and the second internal electrode 122 may be connected to the second external electrode 132 without being connected the first external electrode 131. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically isolated from each other by the dielectric layer 111 interposed therebetween.

Referring to FIG. 5, the body 110 may be formed by alternately laminating a ceramic green sheet on which the first internal electrode 121 is printed and a ceramic green sheet on which the second internal electrode 122 is printed, and then performing sintering thereon.

A material included in the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing, on a ceramic green sheet, an internal electrode conductive paste including at least one of nickel (Ni), copper (Cu), palladium (Pd), silver (Ag), gold (Au), platinum (Pt), tin (Sn), tungsten (W), titanium (Ti), and alloys thereof. A screen-printing method or a gravure-printing method may be used as a method of printing the internal electrode conductive paste, but the present disclosure is not limited thereto.

External electrodes 131 and 132 may be disposed on the third and fourth surfaces 3 and 4 of the body 110.

The external electrodes 131 and 132 may include a first external electrode 131 disposed on the third surface 3 and a second external electrode 132 disposed on the fourth surface 4.

In the present disclosure, a structure is illustrated in which the multilayer electronic component 100 has two external electrodes 131 and 132, but the present disclosure is not limited thereto, and the number and shape of the external electrodes 131 and 132 may be changed depending on a shape of the internal electrode 121 or 122 or other purposes.

For example, the external electrodes 131 and 132 may include electrode layers 131*a* and 132*a* in contact with the third surface 3 and the fourth surface 4 of the body 110, and plating layers 131*b* and 132*b* disposed on the electrode layers.

For more specific examples of the electrode layers 131*a* and 132*a*, the electrode layers 131*a* and 132*a* may be sintered electrodes including a conductive metal and glass or resin-based electrodes including a conductive metal and a resin.

In addition, the electrode layers 131*a* and 132*a* may have a form in which a sintered electrode and a resin-based electrode are sequentially formed on a body. In addition, the electrode layers 131*a* and 132*a* may be formed by transferring a sheet including a conductive metal onto a body or transferring a sheet including a conductive metal onto a sintered electrode.

A material having excellent electrical conductivity may be used as a conductive metal included in the electrode layers 131*a* and 132*a*. For example, the conductive metal may be at least one of nickel (Ni), copper (Cu), and an alloy thereof.

The plating layer may serve to improve mounting properties. A type of the plating layer is not particularly limited, and may be a plating layer including at least one of nickel (Ni), tin (Sn), palladium (Pd), and alloys thereof, and may be formed as a plurality of layers.

For a more specific example of the plating layer, the plating layer may be a Ni plating layer or a Sn plating layer, may have a form in which a Ni plating layer and a Sn plating layer are sequentially formed on the electrode layer, or may have a form in which a Sn plating layer, a Ni plating layer, and a Sn plating layer are sequentially formed. In addition, the plating layer may include a plurality of Ni plating layers and/or a plurality of Sn plating layers.

In the multilayer electronic component 100 according to an aspect of the present disclosure, a protective layer 140 including a plurality of oxides 141 having a wired form may be disposed on at least a portion of an external surface of the body 110.

In the related art, attempts have been made to reduce a thickness of the cover portion 112 or 113 or a width of the margin portion 114 or 115 to achieve miniaturization and high capacitance of a multilayer electronic component. However, when the thickness of the cover portion 112 or 113 or the width of the margin portion 114 or 115 is excessively reduced, the capacitance formation portion Ac may be highly likely to be exposed due to the occurrence of cracks caused by mounting, operation, and external environments of the multilayer electronic component, resulting in a decrease in moisture resistance reliability of the multilayer electronic component.

In order to suppress a decrease in moisture resistance reliability, a method may be used to densify the body 110 by increasing the width of the margin portion 112 or 113 and the thickness of the cover portion 114 or 115, or by adjusting variables such as composition, temperature, and pressure during a sintering process. However, miniaturization and high capacitance of a multilayer electronic components may not be easily achieved, and it may be difficult to precisely control a microstructure, resulting in a decrease in electrical properties.

Accordingly, in the present disclosure, the protective layer 140 including the plurality of oxides 141 having a wired form may be disposed on at least a portion of the external surface of the body 110 of the multilayer electronic component 100 to provide hydrophobic properties to the body 110 and fill a microscopic gap, thereby improving moisture resistance reliability of the multilayer electronic component 100.

In an example embodiment, the external surface of the body 110 may be one of the first, second, fifth, and sixth surfaces 1, 2, 5, and 6, not covered with the external electrodes 131 and 132, among the first to sixth surfaces 1, 2, 3, 4, 5, and 6. The protective layer 140 may be disposed on at least a portion of the external surface of the body 110.

Referring to FIG. 6, the protective layer 140 may include the plurality of oxides 141 having a wired form. The oxides 141 having a wired form may fill a microscopic gap that may be present in a surface of the body 110, and may provide water repellency by improving surface area of an outermost surface of the body 110.

A method of forming the plurality of oxides 141 is not particularly limited. For example, in an example embodiment, the oxides 141 having a wired form may be formed by forming a precursor material on the external surface of the body 110 and then growing the precursor material using chemical vapor deposition or hydrothermal reaction. Accordingly, at least some of the plurality of oxides 141 may be disposed such that one ends thereof are in contact with the body 110. As in an example embodiment, when one ends of at least some of the plurality of oxides 141 are disposed to be in contact with the body 110, adhesive force between the protective layer 140 and the body 110 may be improved.

As a specific example of forming the plurality of oxides 141, when chemical vapor deposition is used, surfaces of the external electrodes 131 and 132 of the multilayer electronic component 100 may be masked, and then pretreatment may be performed on surfaces other than the surfaces of the external electrodes 131 and 132 to coat and attach a catalyst, such as Au. When chemical vapor deposition is performed after such pretreatment, the protective layer 140 including the plurality of oxides 141 including an oxide including Ti, Ba, Zn, Mg, Si, Sn, and In to be described below may be formed on the surfaces other than the surfaces of the external electrodes 131 and 132. In this case, the plurality of oxides 141 may be grown in the form of an oxide during a chemical vapor deposition process, such that additional oxidation treatment may not be necessary.

It may be difficult to form the plurality of oxides 141 with $BaTiO_3$ by only performing one-time chemical vapor deposition. Accordingly, a process of forming the plurality of oxides 141 using $TiO_2$ and then converting the plurality of oxides 141 to $BaTio_3$ may be further performed.

As an example of a method of forming the protective layer 140 at once on a large number of multilayer electronic deposition components 100, chemical vapor may be simultaneously performed on a plurality of chips in a state before the protective layer 140 is formed on the multilayer electronic component 100 by dispersing the plurality of chips in a non-overlapping manner, introducing the plurality of chips into a furnace, adding a precursor of an oxide to be synthesized and Ar gas, and allowing the plurality of chips to react with the precursor and Ar gas at an appropriate atmosphere and temperature.

As another example of forming the plurality of oxides 141, when hydrothermal synthesis is used, a process of uniform hydrothermal synthesis reaction may be performed by adding, to a container such as an autoclave formed of chemically-resistant Teflon capable of maintaining high temperature and high pressure, a plurality of chips in a state before the protective layer 140 is formed on the multilayer electronic component 100 and a magnetic stirrer together. In this case, the plurality of oxides 141 may be grown in the form of an oxide during a hydrothermal synthesis process, such that additional oxidation treatment may not be necessary.

When hydrothermal synthesis is used, specific methods may be slightly different from each other depending on a type of oxide. For example, when a surface of the body 110 includes $BaTiO_3$, an oxide including Ti (for example, $TiO_2$) may be grown directly on the surface of the body 110 during hydrothermal synthesis. When a plurality of oxides 141 are formed with $BaTio_3$, additional hydrothermal synthesis may be performed by forming Ti including an oxide and then impregnating Ti in a solution including Ba ions.

In order to form the plurality of oxides 141 with a material other than an oxide including Ti and $BaTio_3$, using hydrothermal synthesis, the plurality of oxides 141 may be formed by coating a seed material using a method such as sputtering and performing hydrothermal synthesis. In this case, in order to prevent the plurality of oxides 141 from being grown on surfaces of the external electrodes 131 and 132, the surfaces of the external electrodes 131 and 132 may require masking treatment.

An ingredient included in the plurality of oxides 141 are not particularly limited. For example, the plurality of oxides 141 may include, but are not limited to, an oxide including at least one of Ti, Ba, Zn, Mg, Si, Sn, and In.

A method of analyzing types of elements included in the plurality of oxides 141 is not particularly limited. The types and contents of the elements may be determined by polishing the multilayer electronic component 100 to the center thereof in a second direction to expose a cross-section of the multilayer electronic component 100 in first and third directions, and then mapping the cross-section using a scanning electron microscope-energy dispersive X-ray spectrometer (SEM-EDS).

Referring to FIG. 6, the plurality of oxides 141 and an external surface of the body 110 may form an angle. In FIG. 6, an angle θ between the plurality of oxides 141 and the external surface of the body 110 is indicated with respect to the sixth surface 6 of the body 110. With respect to the sixth surface 6, the angle θ may refer to an angle between a straight line corresponding to the sixth surface 6 and a long axis of the plurality of oxides 141 in the cross-section of the multilayer electronic component 100 in first and third directions obtained by polishing the multilayer electronic component 100 to the center of the multilayer electronic component 100 in a second direction.

In this case, an average angle between the plurality of oxides 141 and the sixth surface 6 of the body 110 may be preferably 45 degrees or more and 135 degrees or less, thereby significantly improving water repellency and moisture resistance reliability of the multilayer electronic component 100.

The average angle between the plurality of oxides 141 and the sixth surface 6 of the body 110 may be an average of values obtained by measuring the angle θ between the straight line corresponding to the sixth surface 6 and the long axis of the plurality of oxides 141 with respect to five or more arbitrary oxides, in an image obtained by capturing, with an SEM, the cross-section of the multilayer electronic component 100 in first and third directions obtained by polishing the multilayer electronic component 100 to the center of the multilayer electronic component 100 in a second direction.

When the plurality of oxides 141 are disposed on at least a portion of the external surface of the body according to an aspect of the present disclosure, the measurement of an average value of the angle θ may be applied not only to the sixth surface 6 but also to the first to fifth surfaces.

That is, the average angle between the plurality of oxides 141 and the surface of the body 110 on which the protective layer 140 is disposed may be preferably 45 degrees or more and 135 degrees or less, thereby significantly improving water repellency and moisture resistance reliability of the multilayer electronic component 100.

FIGS. 7A, 7B, and 7C are schematic diagrams illustrating various wires forms according to an aspect of the present disclosure. FIG. 7A illustrates a columnar form 141$a$ in which a wire w is filled, FIG. 7B illustrates a tubular form 141$b$ in which the wire w is hollow, and FIG. 7C illustrates a branched form 141$c$ having the wire w and a sub-wire b branched from the wire W.

As used herein, a wired form of an oxide may refer to a form in which oxide particles are grown in a particular direction or pattern when the oxide particles have a zero-dimensional structure, and may include various forms.

For example, referring to FIGS. 7A, 7B, and 7C, the wired form of the plurality of oxides 141 may include at least one of the columnar form 141$a$ in which the wire w is filled, the tubular form 141$b$ in which the wire w is hollow, and the branched form 141$c$ having the wire w and the sub-wire b branched from the wire w. Accordingly, the plurality of oxides 141 having a wired form included in the protective layer 140 may have a maximized surface area, thereby further water repellency significantly improving surface and moisture resistance reliability of the multilayer electronic component 100.

In an example embodiment, at least some of the plurality of oxides 141 may be connected to each other to form at least one of a two-dimensional structure and a three-dimensional structure.

At least some of the plurality of oxides 141 included in the protective layer 140 may overlap each other or be connected to each other within the protective layer. In an example embodiment, a structure in which at least some of the plurality of oxides 141 are connected to each other may refer to a hierarchical structure in which lower dimensional structures are connected to each other to form a higher dimensional structure, such as one-dimensional wires being connected to each other to form a two-dimensional surface, or one-dimensional wires being connected to each other to form a three-dimensional structure. A method of forming a hierarchical structure of the plurality of oxides 141 within the protective layer 140 is not particularly limited. For example, the hierarchical structure of the plurality of oxides 141 may be formed using methods such as hydrothermal synthesis of self-assembly, chemical vapor deposition, and the like. As in an example embodiment, when at least some of the plurality of oxides 141 are connected to each other to form at least one of a two-dimensional structure and a three-dimensional structure, the protective layer 140 may have a maximized surface area, and the number or size of pores that may be included in the protective layer 140 may be reduced, thereby further significantly improving water repellency and moisture resistance reliability of the multilayer electronic component 100.

In an example embodiment, an additional protective layer including at least one of a silane-based compound and a fluorine-based resin may be disposed on the protective layer 140, thereby further improving water repellency and moisture resistance reliability of the protective layer 140.

Specific examples of the silane-based compound may include silane coupling agents such as 1H, 1H, 2H, 2H-Perfluorooctyltriethoxysilane, octadecyltrichlorosilane, hexadecyltrimethoxysilane, and vinyltriethoxsilane, but the present disclosure is not limited thereto. Specific examples of the fluorine-based resin may include a water-repellent resin such as poly (1, 1, 2, 2-tetrafluoroethylene), but the present disclosure is not limited thereto.

The silane-based compound and the fluorine-based resin may be formed on the protective layer 140 using a vapor deposition method or a plasma method, but the present disclosure is not limited thereto.

A form in which the protective layer 140 is disposed on at least a portion of an external surface of the body 110 may vary depending on the purpose.

Figure 8:
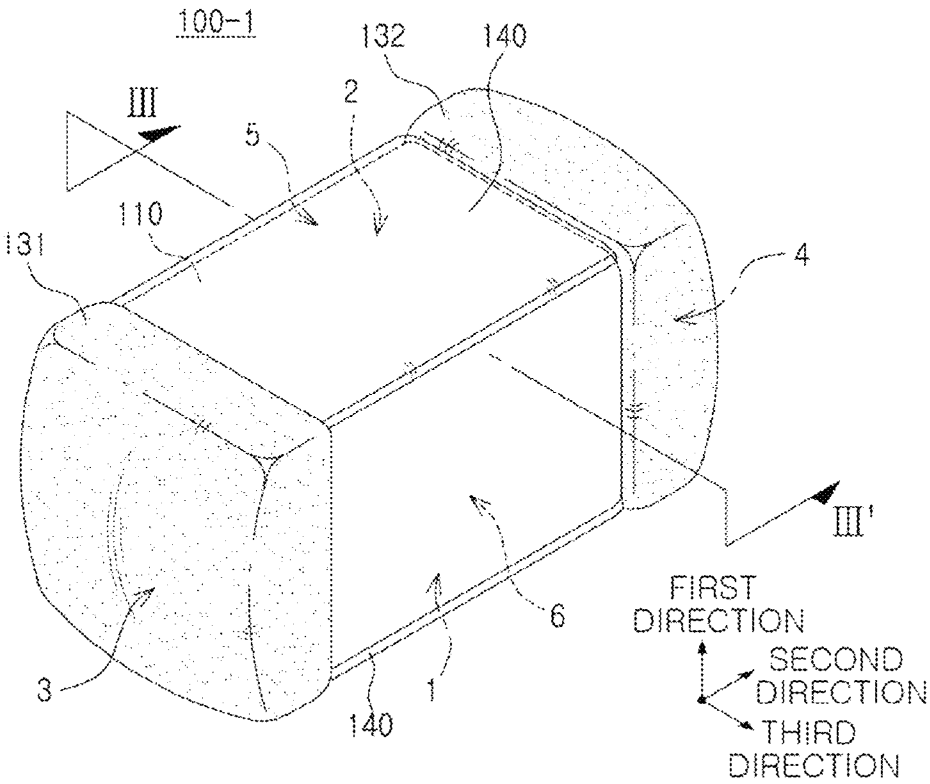
FIG. 8 is a perspective view of a multilayer electronic component according to an example embodiment.
Figure 9:
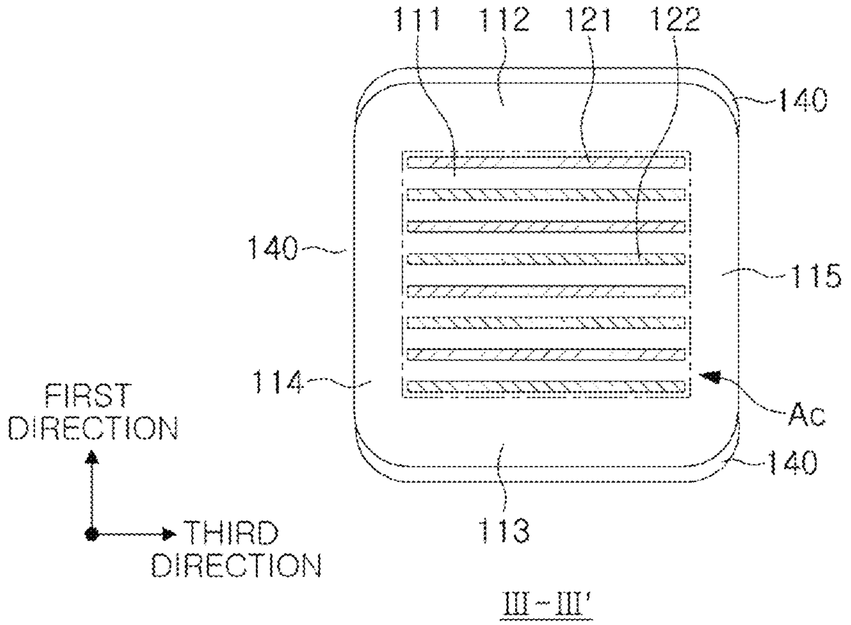
FIG. 9 is a cross-sectional view taken along line III-III' of FIG. 8.

FIG. 8 is a perspective view of a multilayer electronic component according to an example embodiment. FIG. 9 is a cross-sectional view taken along line III-III' of FIG. 8.

Figure 10:
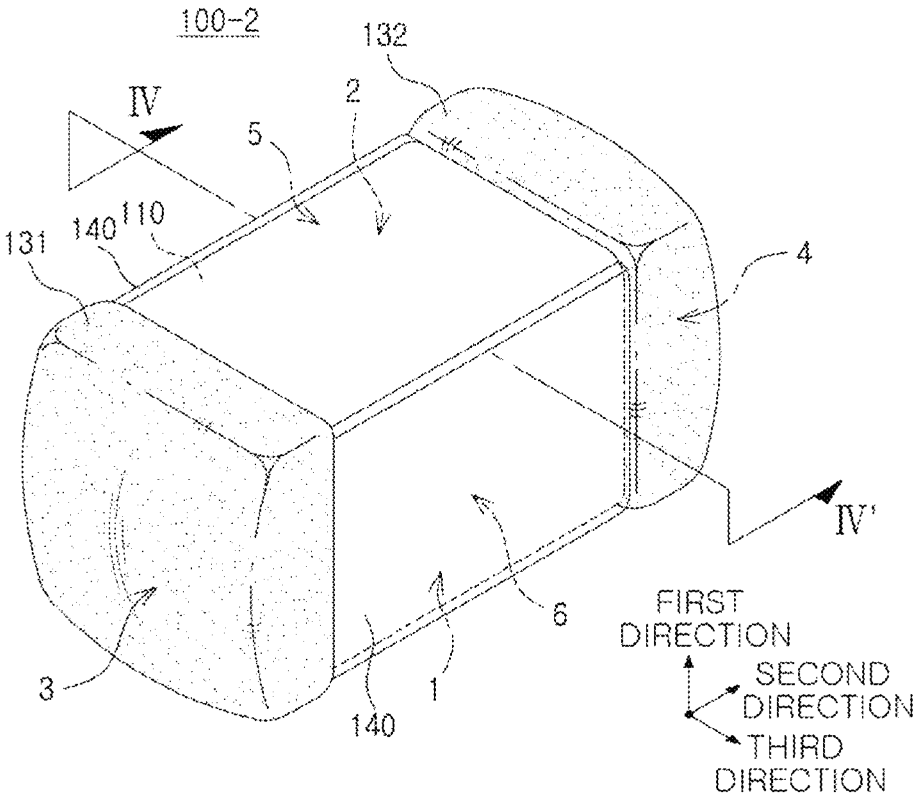
FIG. 10 is a perspective view of a multilayer electronic component according to an example embodiment.
Figure 11:
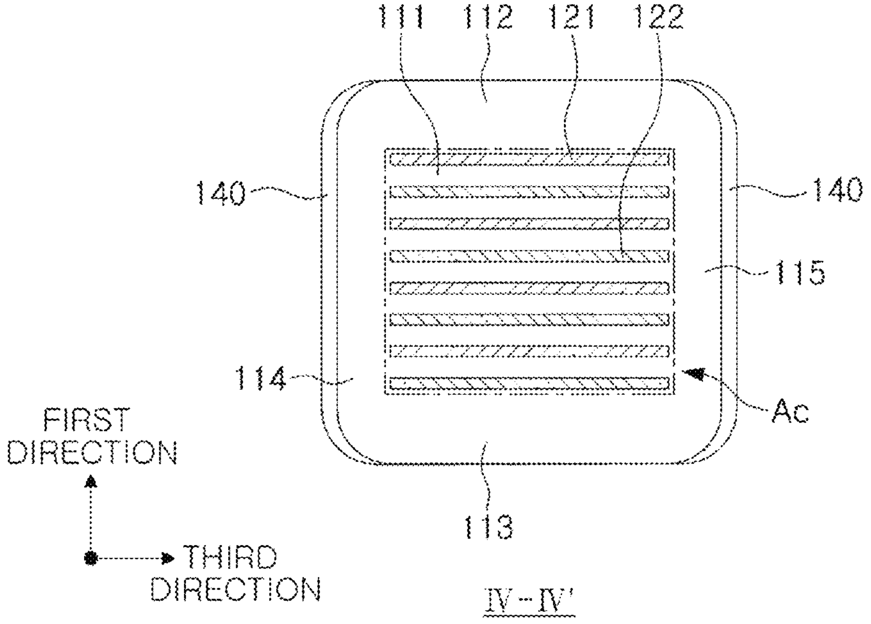
FIG. 11 is a cross-sectional view taken along line IV-IV' of FIG. 10.

FIG. 10 is a perspective view of a multilayer electronic component according to an example embodiment. FIG. 11 is a cross-sectional view taken along line IV-IV' of FIG. 10.

Referring to FIGS. 8 and 9, a protective layer 140 of a multilayer electronic component 100-1 according to an example embodiment may be disposed on a first surface 1 and a second surface 2, among first, second, fifth, and sixth surfaces 1, 2, 5, and 6. Referring to FIGS. 10 and 11, a protective layer 140 of a multilayer electronic component 100-2 according to an example embodiment may be disposed on a fifth surface 5 and a sixth surface 6, among first, second, fifth, and sixth surfaces 1, 2, 5, and 6. Accordingly, the protective layer 140 may be selectively formed on some surfaces, among the first, second, fifth, and sixth surfaces 1, 2, 5, and 6, and thus a proportion occupied by a capacitance formation portion with respect to the entire multilayer electronic component 100 may be improved, thereby improving capacitance per unit volume of the multilayer electronic component 100.

However, the protective layer 140 may not need to be formed on only a portion of an external surface of the body 110. That is, in an example embodiment, the protective layer 140 may be disposed on the first, second, fifth, and sixth surfaces 1, 2, 5, and 6, and thus the protective layer 140 may be formed on the entire external surface of the body 110 on which no external electrode is disposed, thereby further improving moisture resistance reliability of the multilayer electronic component 100.

Figure 13:
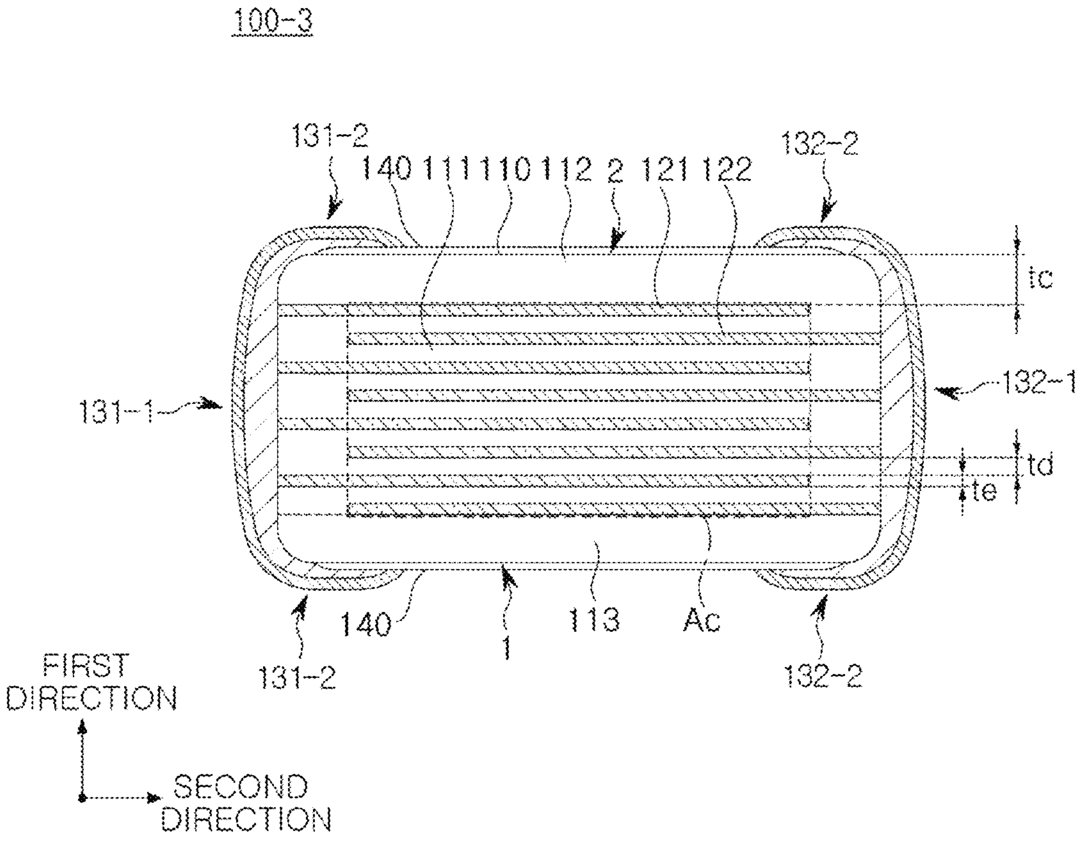
FIG. 13 is a cross-sectional view of a multilayer electronic component in first and second directions obtained by polishing the multilayer electronic component to the center thereof in a third direction according to an example embodiment.

FIG. 13 is a cross-sectional view of a multilayer electronic component in first and second directions obtained by polishing the multilayer electronic component to the center thereof in a third direction according to an example embodiment. Referring to FIG. 13, in a multilayer electronic component 100-3 according to an example embodiment, external electrodes 131 and 132 may include connection portions 131-1 and 132-1 disposed on a third surface 3 or a fourth surface 4 and connected to an internal electrode, and band portions 131-2 and 132-2 disposed to extend from the third or fourth surface to at least one of first, second, fifth, and sixth surfaces 1, 2, 5, and 6. The protective layer 140 may be disposed in a region of a body 110 in which the external electrodes 131 and 132 are not disposed and between the band portion and the body. Accordingly, a microscopic gap that may occur between the band portions 131-2 and 132-2 and the body 110 may be filled with the protective layer 140, thereby further improving moisture resistance reliability of the multilayer electronic component 100-3.

A water-repellent effect provided to the multilayer electronic component 100 by the protective layer 140 may be confirmed through a contact angle between the protective layer 140 and water.

A method of measuring the contact angle between the protective layer 140 and water is not particularly limited. A sample of a region of the multilayer electronic component 100 on which the protective layer 140 is formed, adjacent to an external surface of a body on which the protective layer 140 is formed, may be manufactured, and then a static contact angle of a droplet of ultrapure distilled water may be measured at room temperature, using a contact angle meter. Such a contact angle measurement method may also be applied to a case in which a contact angle between an additional protective layer to be described below and water is measured.

When the contact angle between the protective layer 140 and water is 150 degrees or more, a contact surface between water and the protective layer 140 may be minimized. Thus, it may be determined that the multilayer electronic component 100 has superhydrophobicity.

In order to provide a hydrophobicity to multilayer electronic component according to the related art, attempts have been made to form, on a body surface, a coating layer including a silane coupling agent. However, using such a method, it may be difficult to form a contact angle between a coating layer and water of more than 120 degrees, and additional physical or chemical treatment may be necessary to provide superhydrophobicity of more than 150 degrees. When the protective layer 140 including a plurality of oxides 141 having a wired form is formed on at least a portion of the external surface of the body, as in an aspect of the present disclosure, the contact angle between the protective layer 140 and water may be increased to 150 degrees or more without additional physical or chemical treatment, thereby significantly improving hydrophobicity and moisture resistance reliability of the multilayer electronic component.

The effect of improving hydrophobicity and moisture resistance may vary depending on a shape or size of the plurality of oxides 141 having a wired form. As in an example embodiment, when the wired form has an average length of 1 nm or more and 10000 nm or less or has an average diameter of 1 nm or more and 300 nm or less, or when at least some of the plurality of oxides 141 are connected to each other to form at least one of a two-dimensional structure and a three-dimensional structure, the multilayer electronic component 100 may have more significantly improved hydrophobicity and moisture resistance reliability.

A ratio of the average diameter to the average length of the wired form is not particularly limited. However, in order to easily form the above-described hierarchical structure, the ratio of the average diameter to the average length of the wired form may be preferably ⅓ or less.

A method of observing and measuring a shape and size of the oxide 141 having a wired form is not particularly limited. In an image obtained by observing, with an SEM, a region in which the protective layer 140 is formed at a magnification of 50,000 in a cross-section of the multilayer electronic component 100 in first and third directions obtained by polishing the multilayer electronic component 100 to the center of the multilayer electronic component 100 in a second direction, a diameter (D) and a length (L) of a wire w may be measured with respect to 30 or more arbitrary oxides, and average values thereof may be calculated. In this case, the length (L) may refer to a length of a long axis of an oxide, and the diameter (D) may refer to a length of the oxide in a direction, perpendicular to a direction of the long axis. In this case, when the oxide has a branched form, a sub-wire branched from the wire may be excluded from a measurement target during measurement of the length (L) and the diameter (D).

When an additional protective layer including at least one of a silane-based compound and a fluorine-based resin is disposed on the protective layer 140 including the plurality of oxides 141 having a wired form disposed on at least a portion of the external surface of the body, a contact angle between the additional protective layer and water may be 155 degrees or more, thereby further improving hydrophobicity and moisture resistance reliability of the multilayer electronic component 100.

Figure 14:
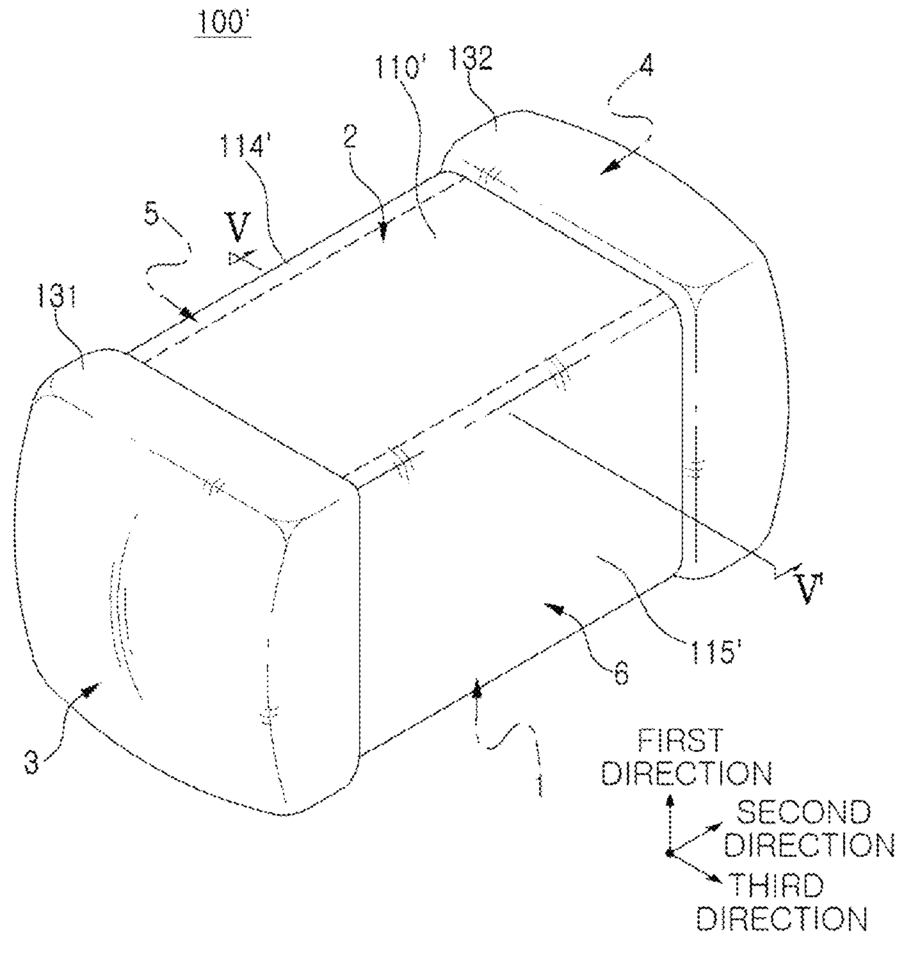
FIG. 14 is a perspective view of a multilayer electronic component according to another aspect of the present disclosure.

FIG. 14 is a perspective view of a multilayer electronic component according to another aspect of the present disclosure.

Figure 15:
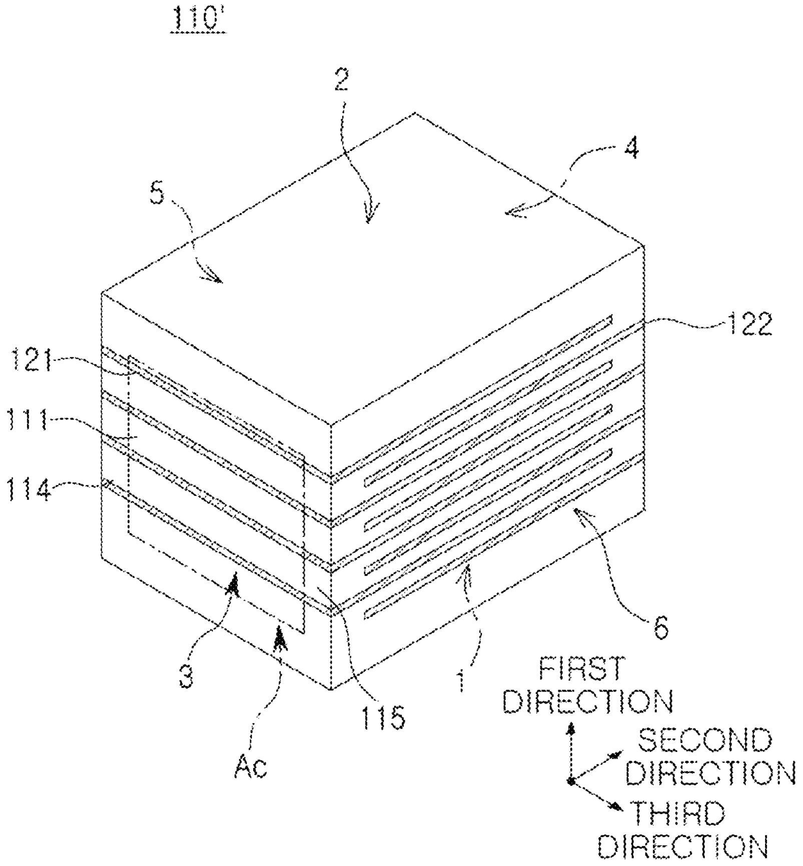
FIG. 15 is a perspective view of a laminate according to an example embodiment.

FIG. 15 is a perspective view of a laminate according to another aspect of the present disclosure.

Figure 16:
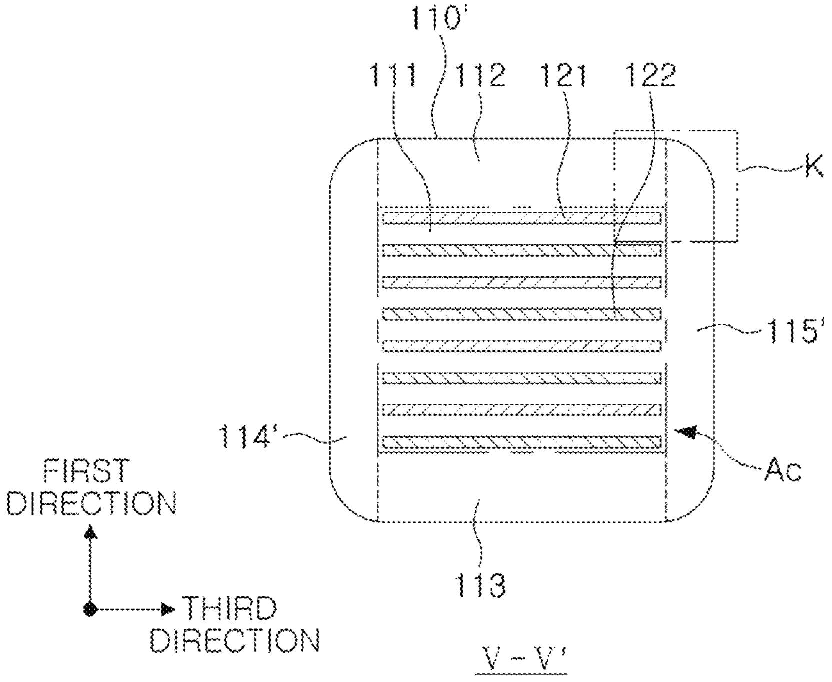
FIG. 16 is a cross-sectional view taken along line V-V' of FIG. 14.

FIG. 16 is a cross-sectional view taken along line V-V' of FIG. 14.

Figure 17:
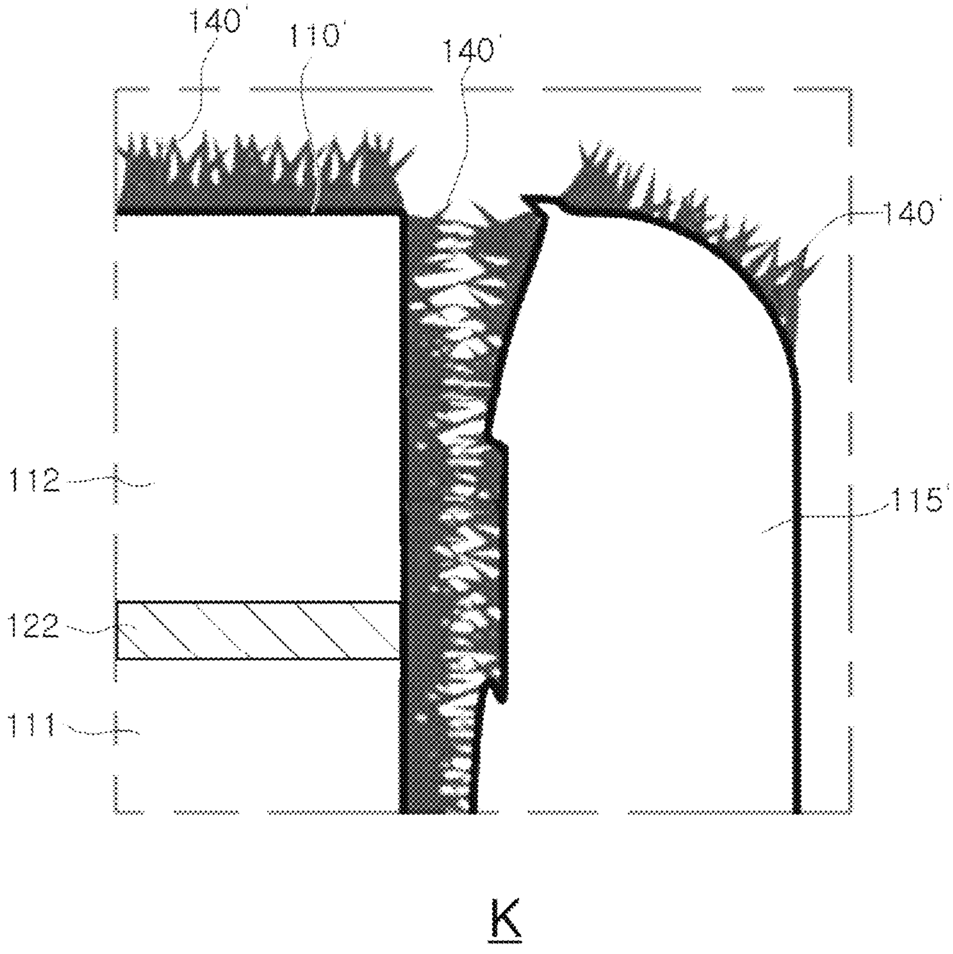
FIG. 17 is an enlarged view of region K of FIG. 16.

FIG. 17 is an enlarged view of region K of FIG. 16.

Hereinafter, a multilayer electronic component 100' according to another aspect of the present disclosure and various example embodiments thereof will be described in detail with reference to FIGS. 14 to 17.

The above-described various example embodiments of the multilayer electronic component 100 according to an aspect of the present disclosure may also be applied to the multilayer electronic component 100' according to another aspect of the present disclosure to be described below, unless contrary or contradictory descriptions are indicated. Thus, repeated descriptions are omitted.

The multilayer electronic component 100' according to another aspect of the present disclosure may include a laminate 110' including a dielectric layer 111 and internal electrodes 121 and 122 disposed alternately with the dielectric layer 111 in a first direction, the laminate having first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, side margin portions 114' and 115' disposed on the fifth and sixth surfaces 5 and 6, and external electrodes 131 and 132 disposed on the third and fourth surfaces 3 and 4. A protective layer 140 including a plurality of oxides 141 having a wired form may be disposed on at least a portion of a space between the laminate 110' and the side margin portion 114'/115'.

Referring to FIG. 15, the laminate 110' may include a dielectric layer 111 and internal electrodes 121 and 122 disposed alternately with the dielectric layer in a first direction, and may have first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction.

In an example embodiment, the first internal electrode 121 included in the laminate 110' may have one end in a second direction in contact with the third surface 3, and may have both ends in a third direction in contact with the fifth surface 5 and the sixth surface 6. The second internal electrode 122 may have one end in a second direction in contact with the fourth surface 4, and may have both ends in a third direction in contact with the fifth surface 5 and the sixth surface 6. Thus, a proportion occupied by a capacitance formation portion Ac with respect to the entire body may be improved, thereby improving capacitance per unit volume of the multilayer electronic component 100' and suppressing a step that may occur during a process of laminating the internal electrodes 121 and 122 and the dielectric layer 111.

The external electrodes 131 and 132 may be disposed on the third surface 3 and fourth surface 4, and the side margin portions 114' and 115' may be disposed on the fifth surface 5 and sixth surface 6. The fifth and sixth surfaces 5 and 6 of the laminate 110' may be portions vulnerable to external moisture permeation since both ends in a third direction of the internal electrodes 121 and 122 are exposed. In the multilayer electronic component 100' according to another aspect of the present disclosure, the side margin portions 114' and 115' may be additionally disposed on the fifth and sixth surfaces 5 and 6, thereby improving moisture resistance reliability and capacitance per unit volume of the multilayer electronic component 100'.

A method of forming the side margin portions 114' and 115' is not particularly limited. For example, the side margin portions 114' and 115' may be formed by laminating a pattern for forming the internal electrodes 121 and 122 and a sheet for forming the dielectric layer 111, cutting the internal electrodes 121 and 122 to be exposed to the fifth and sixth surfaces 5 and 6, and then pressing a ceramic sheet for forming side margin portions to attach the ceramic sheet to the fifth and sixth surfaces 5 and 6 or coating the fifth and sixth surfaces with a ceramic slurry for forming side margin portions and performing sintering thereon.

An ingredient of the ceramic sheet for forming side margin portions or the ceramic slurry for forming side margin portions is not particularly limited, and may be the same as a raw material included in the dielectric layer 111, or may include an ingredient varying depending on the intended purpose thereof.

Referring to FIGS. 16 and 17, when the side margin portions 114' and 115' are additionally disposed on the fifth surface 5 and the sixth surface 6 of the laminate 110', as in another aspect of the present disclosure, a microscopic gap may occur between the laminate 110' and the side margin portions 114' and 115'. The microscopic gap that may occur between the laminate 110' and the side margin portions 114' and 115' may be caused by a difference in shrinkage behavior with the laminate 110' during a process of forming the side margin portions 114' and 115'. Moisture may be adsorbed into the gap or external moisture may permeate causing corrosion of ends of the internal electrodes 121 and 122.

The gap that may occur between the laminate 110' and the side margin portions 114' and 115' may occur at a portion of a boundary surface between the laminate 110' and the side margin portions 114' and 115', and may more frequently occur at ends of the side margin portions 114' and 115'.

Accordingly, in the multilayer electronic component 100' according to another aspect of the present disclosure, the protective layer 140 including a plurality of oxides having a wired form may be disposed on at least a portion of a space between the laminate 110' and the side margin portions 114' and 115' to fill a gap that may occur between the laminate 110' and the side margin portions 114' and 115' with a hydrophobic material, thereby improving moisture resistance reliability of the multilayer electronic component 100'.

A method of disposing a protective layer 140' including a plurality of oxides having a wired form on at least a portion of the space between the laminate 110' and the side margin portions 114' and 115' is not particularly limited. For example, the protective layer 140' may be formed by forming the side margin portions 114' and 115' on the laminate 110', immersing the side margin portions 114' and 115' in a chemical-resistant reaction vessel, and then performing hydrothermal reaction method thereon. The hydrothermal reaction method used to form the protective layer 140' may not only facilitate mass production, but also effectively fill a gap that may occur between the laminate 110' and the side margin portions 114' and 115'.

In an example embodiment, the protective layer 140' may be disposed to extend onto a portion of the first surface 1 and the second surface 2. In addition, in an example embodiment, the protective layer 140' may be disposed to extend onto external surfaces of the side margin portions 114' and 115'.

Accordingly, a gap that may occur between the laminate 110' and the side margin portions 114' and 115' may be filled, and a surface of the laminate 110' may have superhydrophobicity, thereby significantly improving moisture resistance reliability of the multilayer electronic component 100'.

In an example embodiment, one ends of the plurality of oxides 140' may be disposed to be in contact with at least one of surfaces on which the laminate 110' and the side margin portions 114' and 115'. That is, when the plurality of oxides 141 are disposed in a distributed manner in a gap that may occur between the laminate 110' and the side margin portions 114' and 115', the effect of filling the gap that may occur between the laminate 110' and the side margin portions 114' and 115' may be further improved. Accordingly, the multilayer electronic component 100' may have more significantly improved moisture resistance reliability.

Specific properties of the protective layer 140 described in connection with the multilayer electronic component 100 according to an aspect the present disclosure, and a form, characteristic, and composition of the plurality of oxides included in the protective layer 140, may also be applied to the protective layer 140' of the multilayer electronic component 100' according to another aspect of the present disclosure in the same manner.

In an example embodiment, an average angle between the plurality of oxides 141 and a surface of the laminate 110' on which the protective layer 140' is disposed may be preferably 45 degrees or more and 135 degrees or less, and thus the multilayer electronic component 100' may have significantly improved water repellency and moisture resistance reliability.

EXPERIMENT EXAMPLES

Figure 12A:
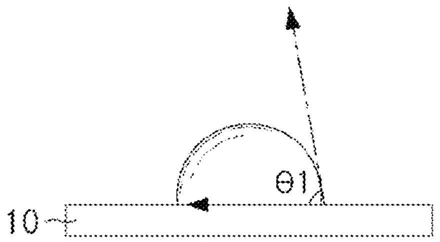
FIGS. 12A and 12B schematically illustrate a result of measuring a contact angle with water in a sample according to a comparative example, and FIGS. 12C and 12D schematically illustrate a result of measuring a contact angle with water in a sample according to an example.
Figure 12B:
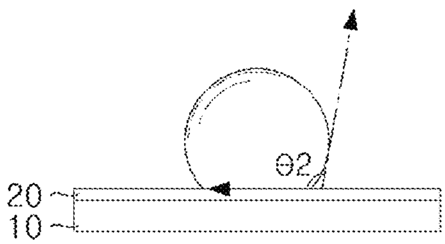
Figure 12C:
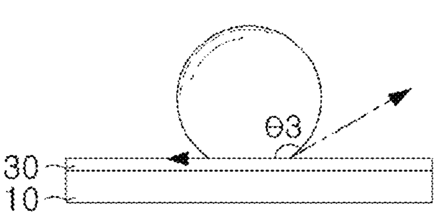
Figure 12D:
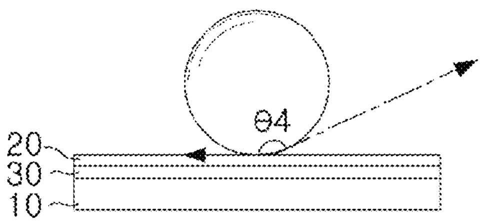

FIGS. 12A and 12B schematically illustrate a result of measuring a contact angle with water in a sample according to a comparative example, and FIGS. 12C and 12D schematically illustrate a result of measuring a contact angle with water in a sample according to an example.

After samples according to the above example and comparative example were prepared, a contact angle with water was measured and indicated in Table 1 below.

Referring to FIGS. 12A to 12D, the contact angle may vary depending on properties of a surface in contact with water.

A body sample 10 was manufactured by sintering a ceramic sheet including $BaTiO_3$ as a main ingredient at a temperature of 1000° C. or more. Depending on the example or the comparative example, the body sample 10 was immersed in a solution including a silane-based compound, washed, dried, and cured to form a coating layer sample 20 or was subject to hydrothermal reaction to form a protective layer sample 20 including a plurality of oxides having a wired form.

Then, a contact angle between a surface of a body sample 10 on which no protective layer is formed and water was denoted by θ1, and an additional protective layer sample 20 including a silane-based compound was formed on the surface of the body sample 10. A contact angle between a surface of the additional protective layer sample 20 and water was denoted by θ2, and a protective layer sample 30 including a plurality of oxides having a wired form according to an aspect of the present disclosure was formed on the surface of the body sample 10. A contact angle between a surface of the protective layer sample 30 and water was denoted by θ3, and a protective layer sample 30 including a plurality of oxides having a wired form according to an aspect of the present disclosure was formed on the surface of the body sample 10, and an additional protective layer sample 20 including a silane-based compound was formed on the protective layer sample 30. A contact angle between a surface of the additional protective layer sample 20 and water was denoted by θ4. A contact angle was measured in five samples per comparative example and example. A contact angle for each test number was measured at the same temperature, and a static contact angle was measured using a contact angle meter.

TABLE 1

| Test No. | Sample | Contact Angle (degree) | |
|---|---|---|---|
| 1 | Body sample 10 | θ1 | 80.1 ± 5.4 |
| 2 | Body sample 10 + Additional protective layer sample 20 | θ2 | 103.0 ± 3.6 |

TABLE 1-continued

| Test No. | Sample | Contact Angle (degree) | |
|---|---|---|---|
| 3 | Body sample 10 + Protective layer sample 20 | θ3 | 152.9 ± 2.8 |
| 4 | Body sample 10 + Protective layer sample 20 + Additional protective layer sample 20 | θ4 | 157 ± 3.0 |

In Test No. 1, θ1 is 80.1±5.4 degrees, and thus the sample is hydrophilic. In Test No. 2, θ1 is 103.0±3.6 degrees, and thus the sample is hydrophobic.

In Test No. 3, θ3 is 152.9±2.8 degrees, and thus a contact angle of more than 150 degrees is observed, and it can be confirmed that the sample is superhydrophobic. Accordingly, when the protective layer 140 including the plurality of oxides 141 is disposed on at least a portion of an external surface of the body 110, as in an aspect of the present disclosure, a surface of the multilayer electronic component 100 may have superhydrophobicity, thereby improving moisture resistance reliability.

In Test No. 4, θ4 is 157±3.0 degrees, which is a value greater than θ3 of Test No. 3. Accordingly, when an additional protective layer including a silane-based compound is disposed on the protective layer 140, as in an example embodiment, a multilayer electronic component may have more significantly improved moisture resistance reliability.

While example embodiments have been shown and described above, it will be apparent to those skilled in the art that modifications and variations could be made without departing from the scope of the present disclosure as defined by the appended claims.

In addition, the term "an example embodiment" used herein does not refer to the same example embodiment, and is provided to emphasize a particular feature or characteristic different from that of example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

The terms used herein is for the purpose of describing particular example embodiments only and is not to be limiting of the example embodiments. As used herein, the singular forms "a," "an," and "the" are intended to include the plural forms as well, unless the context clearly indicates otherwise.

What is claimed is:

1. A multilayer electronic component comprising:

a body including a dielectric layer and an internal electrode disposed alternately with the dielectric layer in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;

an external electrode disposed on one of the third and fourth surfaces; and a protective layer including a plurality of oxides having a wired form and disposed on at least a portion of an external surface of the body, wherein the protective layer is disposed on at least two surfaces, among the first, second, fifth, and sixth surfaces, and wherein the plurality of oxides include an oxide including at least one of Ti, Ba, Zn, Mg, Si, Sn, and In.

2. The multilayer electronic component of claim 1, wherein the protective layer is disposed on the first and second surfaces, among the first, second, fifth and sixth surfaces.

3. The multilayer electronic component of claim 1, wherein the protective layer is disposed on the fifth and sixth surfaces, among the first, second, fifth, and sixth surfaces.

4. The multilayer electronic component of claim 1, wherein the protective layer is disposed on the first, second, fifth and sixth surfaces.

5. The multilayer electronic component of claim 1, wherein first ends of at least some of the plurality of oxides are in contact with the body.

6. The multilayer electronic component of claim 1, wherein at least some of the plurality of oxides are connected to each other to form at least one of a two-dimensional structure and a three-dimensional structure.

7. The multilayer electronic component of claim 1, wherein the wired form includes at least one of a columnar form in which a wire is filled, a tubular form in which the wire is hollow, and a branched form having the wire and a sub-wire branched from the wire.

8. The multilayer electronic component of claim 1, wherein the wired form has an average length of 1 nm or more and 10000 nm or less, or has an average diameter of 1 nm or more and 300 nm or less.

9. The multilayer electronic component of claim 1, wherein a ratio of an average diameter to an average length of the wired form is ⅓ or less.

10. The multilayer electronic component of claim 1, wherein an average angle between the plurality of oxides and the portion of the external surface of the body on which the protective layer is disposed is 45 degrees or more and 135 degrees or less.

11. The multilayer electronic component of claim 1, further comprising an additional protective layer including at least one of a silane-based compound and a fluorine-based resin and disposed on the protective layer.

12. The multilayer electronic component of claim 11, wherein a contact angle between the additional protective layer and water is 155 degrees or more.

13. The multilayer electronic component of claim 1, wherein a contact angle between the protective layer and water is 150 degrees or more.

14. The multilayer electronic component of claim 1, wherein the external electrode includes a connection portion disposed on the one of the third and fourth surfaces and connected to the internal electrode, and a band portion disposed to extend from the one of third and fourth surfaces to at least one of the first, second, fifth, and sixth surfaces, and the protective layer is disposed between the band portion and the body.

15. A multilayer electronic component comprising:

a laminate including a dielectric layer and an internal electrode disposed alternately with the dielectric layer in a first direction, the laminate having first and second surfaces opposing each other in the first direction, third and fourth surfaces connected to the first and second surfaces and opposing each other in a second direction, and fifth and sixth surfaces connected to the first to fourth surfaces and opposing each other in a third direction;

a side margin portion disposed on one of the fifth and sixth surfaces;

an external electrode disposed on one of the third and fourth surfaces; and a protective layer including a plurality of oxides having a wired form and disposed on at least a portion of a space between the laminate and the side margin portion.

16. The multilayer electronic component of claim 15, wherein the protective layer is disposed to extend onto a portion of the first and second surfaces of the laminate.

17. The multilayer electronic component of claim 15, wherein the protective layer is disposed to extend onto an external surface of the side margin portion.

18. The multilayer electronic component of claim 15, wherein one ends of some of the plurality of oxides are disposed to be in contact with at least one of surfaces on which the laminate and the side margin portion oppose each other.

19. The multilayer electronic component of claim 15, wherein at least some of the plurality of oxides are connected to each other to form at least one of a two-dimensional structure and a three-dimensional structure.

20. The multilayer electronic component of claim 15, wherein the wired form includes at least one of a pillar form in which a wire is filled, a tube form in which the wire is hollow, and a branched form having the wire and a sub-wire branched from the wire.

21. The multilayer electronic component of claim 15, wherein the wired form has an average length of 1 nm or more and 10000 nm or less, or has an average diameter of 1 nm or more and 300 nm or less.

22. The multilayer electronic component of claim 15, wherein a ratio of an average diameter to an average length of the wired form is ⅓ or less.

23. The multilayer electronic component of claim 15, wherein an average angle between the plurality of oxides and a surface of the laminate on which the protective layer is disposed is 45 degrees or more and 135 degrees or less.

24. The multilayer electronic component of claim 15, wherein the plurality of oxides include an oxide including at least one of Ti, Ba, Zn, Mg, Si, Sn, and In.

25. The multilayer electronic component of claim 15, further comprising an additional protective layer including at least one of a silane-based compound and a fluorine-based resin and disposed on the protective layer.

26. A multilayer electronic component comprising:

a laminate including a dielectric layer and an internal electrode disposed alternately with the dielectric layer in a first direction, the laminate having first and second surfaces opposing each other in the first direction, third and fourth surfaces connected to the first and second surfaces and opposing each other in a second direction, and fifth and sixth surfaces connected to the first to fourth surfaces and opposing each other in a third direction;

an external electrode disposed on one of the third and fourth surfaces; and a plurality of oxide wires extending away from at least a portion of an exterior surface among the first, second, fifth, and sixth surfaces of the laminate.

27. The multilayer electronic component of claim 26, wherein the plurality of oxide wires have a columnar form, a tubular form, a branched form, or a combination thereof.

28. The multilayer electronic component of claim 26, wherein the plurality of oxide wires an average length of 1 nm or more and 10000 nm or less, or has an average diameter of 1 nm or more and 300 nm or less.

29. The multilayer electronic component of claim 26, wherein an average angle between the plurality of oxide wires and the portion of the exterior surface of the laminate is 45 degrees or more and 135 degrees or less.

30. The multilayer electronic component of claim 26, further comprising a silane-based compound or a fluorine-based resin disposed on the plurality of oxide wires.

31. The multilayer electronic component of claim 26, further comprising a side margin portion disposed on one of the fifth and sixth surfaces.

* * * * *